Figure 5:
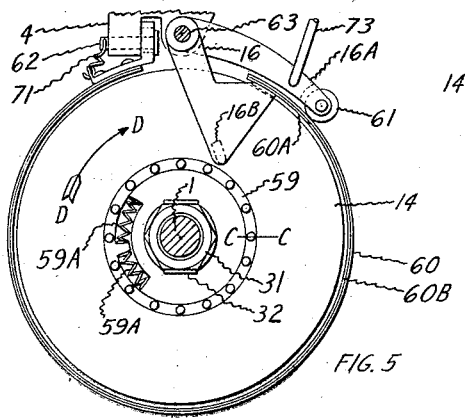

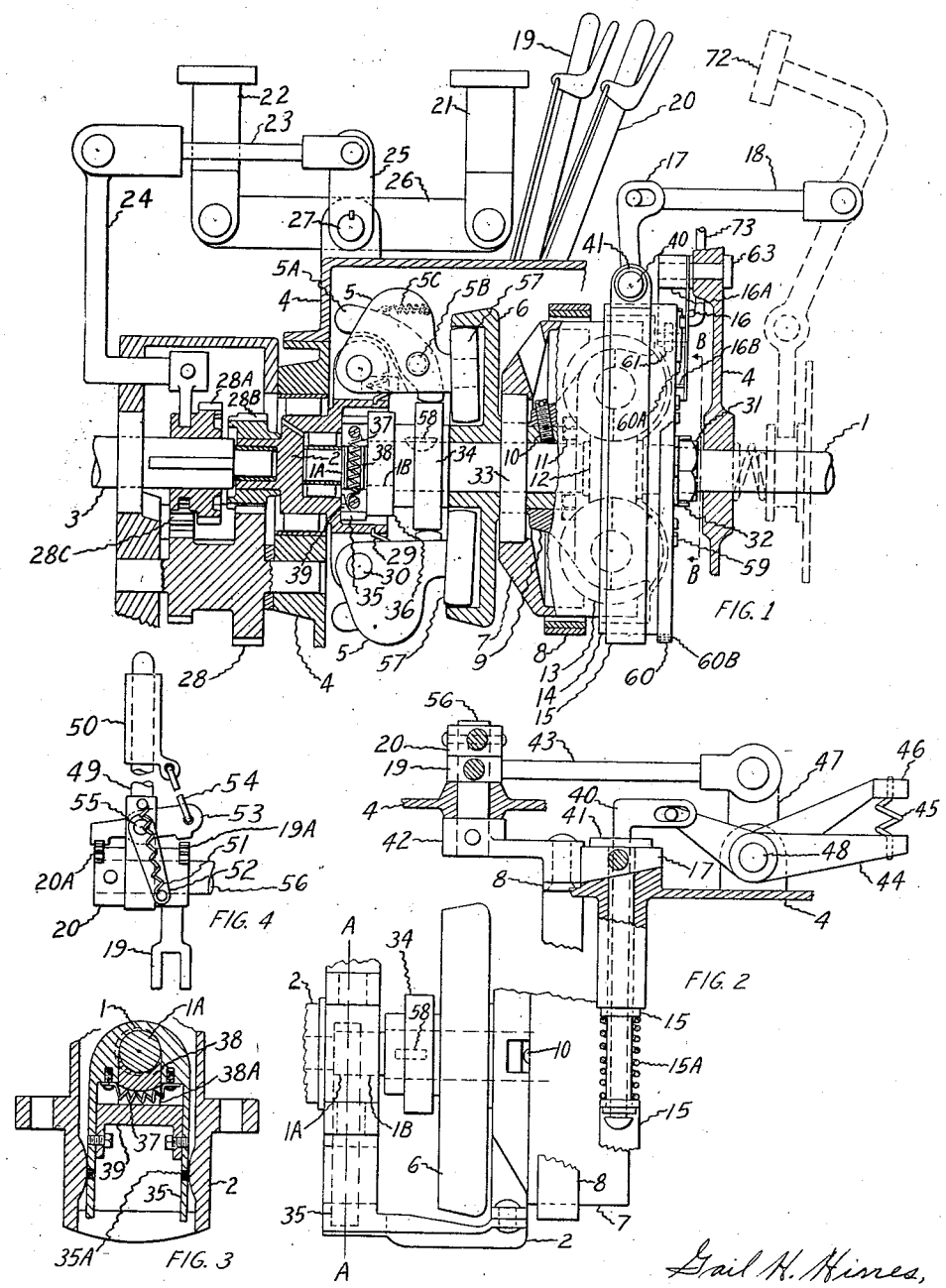

July 1, 1930.  G. H. HINES  1,768,839
FLEXIBLE AUTOMATIC TRANSMISSION
Filed Dec. 7, 1928    2 Sheets-Sheet 2

Gail H. Hines,
INVENTOR

Patented July 1, 1930

1,768,839

UNITED STATES PATENT OFFICE

GAIL H. HINES, OF LANSING, MICHIGAN

FLEXIBLE AUTOMATIC TRANSMISSION

Application filed December 7, 1928. Serial No. 324,402.

The invention relates to power transmission, and particularly to the connection between a driving element such as the crankshaft of an ordinary automobile motor and a driven element such as the load shaft in positive driving relation with the rear wheels of an automotive vehicle, whereby the speed of the driven element may be varied automatically from that of the driving element in a gradually rising ratio as distinguished from a step by step ratio.

By the invention also the speed relation between the driving and driven elements is changed automatically not only by variations in load, but also by variations in the speed of the driven element to conform to that of greatest efficiency under the resistance torque conditions existing at the time.

Moreover, under abnormal conditions, as where traction is poor and the resistance of the load at high speed is practically nil, provision is made for manually broadening the transmission ratio to a point corresponding to the greatest traction efficiency under the existing conditions; however it will be obvious that in my device the relation of the torque control mechanism and the speed control mechanism is such that a resort to the foregoing emergency provision is practically unnecessary.

Furthermore, the last mentioned manual control is adapted to be employed as a braking mechanism when it is desired to descend a steep grade with the device locked into low or slow gear instead of the high or fast gear which would normally be effected.

And still another object of the invention is to include means whereby to quickly disconnect or render inoperative certain elements of the device to allow easy towing of an automobile.

While the invention is particularly applicable to a motor vehicle and is hereinafter described in that connection, its field of usefulness is not thus limited, but includes power transmission generally, as in machine tools, where it is desirable to translate substantially constant speed of a main drive into variable speeds at the machine and automatically to vary the ratio of transmission to maintain the highest efficiency at the point of application.

Provision is made for reversing the direction of drive from that of the power shaft, and maintaining the reverse movement under the same conditions as in the forward drive with reference to automatic change of transmission ratio to conform to change in load and load-speed. The forward drive, it will be understood is utilizable independently of the reverse, and in shop installations the reverse would usually be omitted as not needed in the transmission of power from a line shaft to machines driven therefrom.

In general it is my aim to set forth these and certain other improvements and refinements which I have invented to elaborate upon the particular devices set forth in my Letters Patent No. 1,678,595, granted July 24, 1928, and No. 1,681,613, granted Aug. 21, 1928, on Power control devices, to which I refer you for more complete information regarding the basic idea upon which is made the improvements herein set forth, and in which previous Letters Patent some of the mechanisms herein employed are illustrated more in detail.

The annexed drawings and the following description set forth in detail certain mechanisms embodying the invention, such disclosed means constituting, however, but few of the various mechanical forms in which the principle of the invention may be used.

Figure 6:
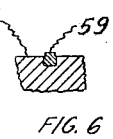
Figure 7:
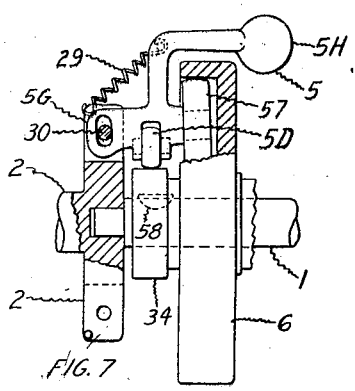
Figure 8:
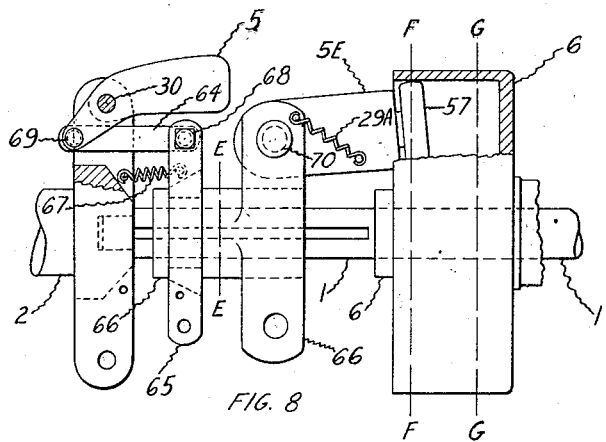
Figure 9:
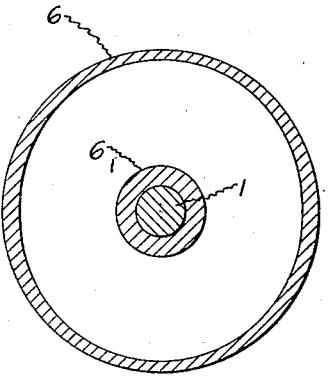
Figure 11:
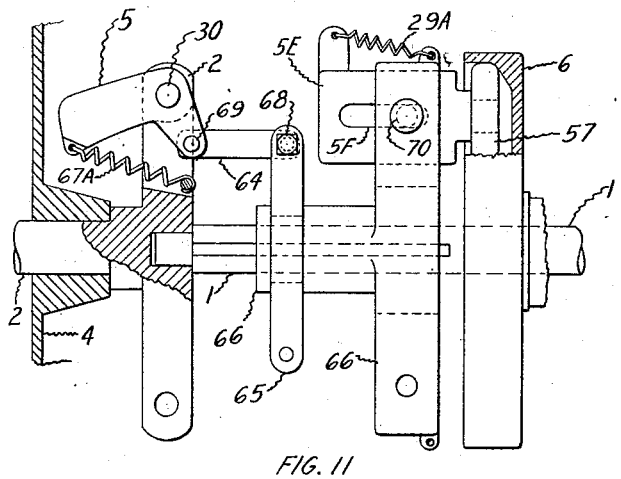
Figure 10:
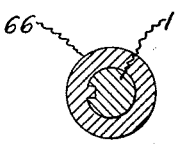

In said annexed drawings:—Figure 1 is a side elevational view, in part a side elevation and in part a vertical section, showing one embodiment of my invention featuring all claims hereto annexed. Fig. 2 is a fragmentary view, in part a horizontal section and in part a plan showing several constructions illustrated in elevation in Fig. 1 which are not particularly shown in my Letters Patent No. 1,678,595 and No. 1,681,613. Fig. 3 is a sectional view taken on line A—A of Fig. 2. Fig. 4 is a fragmentary view showing a construction which I may employ wherein I use one hand-lever to operate the brake bands 8 and 15 shown in Fig. 1. Fig. 5 is a front end view taken on line B—B of Fig. 1. Fig. 6 is a section taken on line C—C of Fig. 5. Fig. 7 is a fragmentary view showing an equivalent construction for the formation and arrangement of the centrifugal weights as employed in my device. Fig. 8 is a similar view showing another equivalent construction and use of centrifugal weights. Fig. 9 is a section taken on line G—G of Fig. 8. Fig. 10 is a section taken on line E—E of Fig. 8. Fig. 11 is a view similar to Fig. 8 and shows still another construction and use of centrifugal weights employed to provide an automatically governed clutch such as is one of the principal features of my invention.

Inasmuch as certain mechanisms in my device are, generally, made up of two like parts arranged symmetrically in pairs I may hereinafter indicate like parts, thusly arranged, as being plural but designated by the same single symbol.

Referring to the drawings, shafts 1, 2, and 3 are journaled in alignment for relative rotation, one to the other, in the case 4. The driving shaft 1 is positively connected to the driven shaft 2 by means of a planetary differential gear-assembly such as is more particularly illustrated in Fig. 9 of the aforesaid Patent No. 1,678,595, in which the spiral gear 12 is fixed to the driving shaft 1 and is in mesh with a pair of spiral planet-gears 13. The planet-gears 13 are also in mesh with an internal spiral-gear 7 which is fixed to the driven shaft 2 and are journaled for rotation in a carrier including a drum 14, a hub element 9 and a cam 6. The gear 7 may be formed fixed integrally with the shaft 2, or formed as is particularly shown in Fig. 2 of the drawings where I illustrate the shaft 2 formed with a projecting arm (preferably a pair, with one arm diametrically opposite the other and disposed longitudinally relative to the shaft 1 and at a suitable radial distance to clear the periphery of the cam 6) fitted to another flanged arm, the latter suitably formed integral with the gear 7 and extending radially outward for connection with the forward extremity of the arm of the shaft 2 maintained united in a common and ordinary riveted joint; and when a pair of weights 5 are employed it is preferable to provide a pair of these arms integral with the shaft 2 formed on the quarters which are ninety degrees apart from the quarters which carry the weights 5; whereas I have shown a pair of weights 5 carried on two quarters in the vertical sectional view, Fig. 1, and whereas the one of the pair of arms remaining for illustration in Fig. 1 is hidden from view behind the shaft 1, but will be clearly understood from these interpretations of Fig. 2 of the drawings wherein such connecting elements are shown reposing in the horizontal quarters. To the rear of the drum 14 the hub element 9 is secured by means of the cap screws 11, and to the rear of the hub element 9 is secured the cam 6 by means of screws 10 forming the planet-gear carrier which is mounted on the shaft 1 for relative rotation to the latter. The drum is held against end thrust by means of a nut 31 threaded onto the shaft 1 and locked by means of the lip washer 32. The drum 14 is intermittently clutched or locked to the case 4 by means of a brake band 60 which may be lined with any suitable friction material 60B such as interwoven copper and asbestos or the like. One end of the brake band 60 is anchored to an ear projecting inwardly from the case 4 by means of a pin 62, and the other end of the band 60 is carried in sliding and rolling contact with an actuating mechanism including a metal pad 16B fixed to a resilient member 16 swaged to a hub portion of one end of an arm 16A, the latter having its other end bifurcated to carry a roller 61 in rolling contact with the peripheral surface of the band 60. The end of the arm 16A which is formed into a hub shaped boss is pivoted in the case 4 on a pin 63 to allow swinging movement of the roller 61 and the metal pad 16B, the latter being of a disposition to bear frictionally against the front face of the drum 14 perforce of tension in the resilient element 16, the latter being formed to contact with the inner surface of a ledge-like forward projection 60A of the free end of the band 60. A rod 73 is hooked into a suitable opening in the arm 16A and is of a disposition to project upward and terminate within handy reach of the operator to be hooked up or latched in any ordinary manner for the purpose of rendering the brake band actuator inoperative. The band 60 is annular in form except for a working gap between its ends and encircles the drum 14 under a tension within its metallic element to normally provide a slight clearance between the periphery of the drum 14 and the friction lining 60B. A spring 71 of suitable tension may be hooked from the pin 62 to the band 60 to support the weight of the band which is carried for relative movement with the pin. In the front face of the drum 14 is recessed an annular groove concentric with the axis of said drum and formed to slidably receive an annular, studded ring 59, the studs of said ring being equally spaced and projecting forward beyond the ring body, front surface, which is disposed flush with the front face of the drum 14, and said studs are located radially to be engaged by the suitably formed metal pad 16B when rotation of the drum 14 carries said pad in one direction and to be disengaged when the pad is carried swingingly in its other direction effected by the rotation of the drum relative to the case 4. The ring 59 is limited in its relative movement to the drum 14 by means of compression springs 59A under tension between the ring and the drum, a suitable recess being formed in the drum to accommodate the springs.

The driven shaft 2 is journaled for rotation relative to the driving shaft 1 and because of its fixed connection with the gear 7 is supported at its forward end on a ball-bearing assembly 33 which is fitted into the gear 7 and onto a sleeve-like portion of the cam 6. An automatically actuating centrifugal clutch connects the planet-gear carrier and the driven shaft 2 to the driving shaft 1, wherein a cam 34 which is preferably elliptical in cross section is fixed to the driving shaft 1 by means of a key 58, said cam being disposed in operative contact with a pair of weights 5A which are pivoted on pins 5B in a second pair of weights 5 so formed and arranged that under centrifugal pressure the weights 5 bear upon the elliptical race of the cam 6 through a pair of rollers 57 loosely mounted upon suitable stud-like portions of the weights 5 while simultaneously the centrifugal pressure in the weights 5A causes them to bear against the elliptical race of the cam 34, each weight 5 being pivoted on a pin 30 between a pair of ears suitably formed on the driven shaft 2. A spring 5C is hooked between each weight 5 and 5A in a relation to always cause each roller 57 to bear against the cam race of the cam 6. Also a second pair of springs 29 may be suitably disposed under tension between the weights 5 and the driven shaft 2 to cause the rollers 57 to always bear against the cam race of the cam 6.

Another pair of weights 35 and 36 may operatively connect the driving shaft 1 to the driven shaft 2, the weight 35 being freely mounted on an eccentric 1A, and the weight 36 likewise on a second eccentric 1B, each eccentric being formed on the driving shaft 1, the weight 35 being disposed radially diametrically opposite the weight 36 except that the weights do not stand in the same vertical plane; however such weights and eccentrics may be disposed as shown in Fig. 9 of the aforesaid Letters Patent No. 1,678,595. Each weight 35 and 36 is held positioned on its respective eccentric by means of a cap 38 in turn held positioned perforce of the tension of a spring 37 secured to its respective weight. A removable weight element 39 may be shifted in its radial position in its respective carrier 35 or 36; or said weight element 39 may be readily removed and a similar weight element of different weight substituted to vary the clutching effect when operating under centrifugal pressure. In their reciprocative movements the weights 35 and 36 are guided between suitably formed walls of the driven shaft 2.

In alignment with the driven shaft 2 is journaled a second driven shaft 3 which is operatively connected to the aforesaid shaft by means of a reverse-gear assembly 28 such as is commonly employed in automobile design. The shiftable gear 28A is operatively connected to a shifting bar 24, a connecting rod 23, a lever 25 in fixed connection with the connecting rod and a rock-shaft 27, the latter in fixed connection with a foot-pedal lever 26 which in turn carries the forward foot-pedal 21 and the reverse foot-pedal 22.

A brake band 15 similar to the band 60 encircles the drum 14 rearwardly adjacent to the last named band and is operatively connected to a manually operated cam-lever 17. A connecting rod 18 joins the lever 17 to a clutch pedal such as is ordinarily employed to engage the motor power. An elongated hole in the outer extremity of the lever 17 is engaged by the connecting rod 18 in a manner to permit certain freedom of movement of the clutch pedal without effecting movement in the lever 17. A spring 15A is employed in an ordinary manner to normally hold the band 15 disengaged from the drum 14. The sleeve 41 is flanged at its outer extremity to cause it to be slidably moved in its boss in the case 4 by means of the cam-lever 17, and opposite its flanged end the sleeve 41 at its inner end is headed over to hold the band 15 in operative position. Loosely mounted on the shaft 56 is a hand lever 19 which is also operatively connected to the band 15 by means of the connecting rod 43, the levers 47, 46 and 44, the rock-shaft 48 and the shiftable shaft 40. The levers 47 and 46 are fixed to the rock-shaft 48, and the lever 44 is loosely mounted on the shaft 48 being operatively connected to the lever 46 by means of the compression spring 45. The lever 19 may be of best commercial design with ratchets for locking it in required positions.

A parking brake may be provided wherein a brake band 8 similar to the band 15 encircles the smooth peripheral surface of the gear 7 and may be operated by a hand lever in any ordinary manner, or as illustrated in Fig. 2 of the drawings a hand lever 20 may be fixed to the rock-shaft 56, and operative connection to the band 8 may be made by means of a suitably formed lever disposed with one end fixed to the rock-shaft 56 and the other end fixed to the movable extremity of the band 8, the other end of said band being anchored to the case 4.

In the operation and use of my improved automatic transmission, for example one may consider the device as employed in an automobile. A downward push of the operator's foot on the pedal 21 shifts the gear 28A from neutral position into locked relation with the gear 28B which is fixed to the shaft 2 effecting a positive connection between the latter and the shaft 3 as is common practice for selecting the forward drive of an automotive vehicle. The driving shaft 1 is gradually clutched to the motor and then rotates in the direction as indicated by the arrow D—D of Fig. 5 of the drawings at crankshaft speed driving the gear 12 transmitting power through the planet-gears 13 and the reduction gear 7 to the driven shafts 2 and 3 and hence to the rear wheels of the automobile. In starting the car from rest at first the resistance torque in the driven shaft is great and the lesser driving torque in the shaft 1 is multiplied through the gearing and moves the car slowly forward; however not without a strong pressure from the resistance torque tending to force the drum 14 and planet-gear carrier to rotate in a retrograde direction relative to the rotation of the driving shaft 1. Such retrograde rotation is prevented by means of the brake band 60 which automatically is clutched forcibly in frictional contact with the drum 14 when a slight retrograde movement of the latter swings the friction pad 16B into engagement with one of the lugs projecting from the ring 59 and the roller 61 is caused to bear the free end of the band 60 into contact with the peripheral surface of the drum 14 effecting to cause the band to wrap tightly to the drum and hold it into locked relation with the case 4 until my centrifugally operating clutch mechanism functions in a measure to impel the drum 14 to rotate in the direction indicated by the arrow D—D in Fig. 5 of the drawings, then the automatically actuated band 60 unclutches from the drum 14 and is held free by means of the pivoted member 16 including the pad 16B, the spring 71 and the normal tension on the band 60. Action of the automatically actuating centrifugal clutch accelerates the speed of rotation of the drum 14 in ratios dependent upon both the speed of the vehicle and the resistance torque. As the car is driven forward certain centrifugal pressure in the weights 5 causes the rollers 57 to bear proportionately heavily on the elliptical race of the cam 6, and while the planet gears 13 are rotating the cam 34 is rotating relatively faster than the weights 5 are being revolved upon the shaft 2, hence the work which is done by the cam 34 moving the weights 5A against centrifugal resistance impels the shaft 2 to rotate faster relative to the driving shaft 1 in a measure proportionate to the centrifugal pressure from the weights 5A likewise bearing proportionate to the speed of the vehicle. While the car is moving slowly the work of moving the weights 5A has a slight braking effect upon the motor; however, inasmuch as this braking effect is transmitted directly from the driven shaft 2 to the driving shaft 1 there is always a direct impelling force which varies in magnitude directly with the speed of the vehicle. As the car gains speed there is greater direct impelling force which relieves the gears of part of their work and lessens the force tending to cause retrograde rotation in the drum 14 while gradually the rollers 57 of the weights 5 clutch stronger with the cam 6 shunting some of the direct drive from the shaft 1 into the cam 6 impelling rotation in the planet-gear carrier causing the planet gears to revolve about the axis of the shaft 1 and to rotate more slowly gradually effecting a succession of intermediate speed ratios between the driving and driven shafts 1 and 2 until the latter rotates at crankshaft speed. When the planet-gear carrier is forced to rotate at less than crankshaft speed the planet-gear fulcrum is supported by some of the motor power in excess of what is utilized directly to drive the car at its concurrent speed, and it will be understood that motor power which is in reserve may be brought into play by opening the motor throttle to impel faster rotation in the planet-gear carrier causing a variable multiplication of torque until the final and complete direct drive is effected.

It will be understood that I may have a complete working device without employing the weights 35 and 36; however, I wish to make it clear that these weights which function very similar to the weights 5A to clutch the shaft 2 directly to the shaft 1 may be employed to add more and smoother clutching effect; and when employed each rotation of the driving shaft 1 gained over the driven shaft 2 completes a cycle of reciprocative movement of these weights 35 and 36 which are directly and positively operated by means of the diametrically opposed eccentrics 1A and 1B integral with the shaft 1 so that under centrifugal pressure proportionate to the speed of rotation of the driven shaft 2 they gradually clutch the latter to the driving shaft 1.

Inasmuch as the speed necessary to maintain the vehicle in high gear depends upon the resistance torque as well as the speed of the vehicle it will be noted that the device may function in high gear while driving a car at three miles per hour on a level pavement, whereas a speed of ten miles per hour may be required to maintain high gear in deep sand. However it is clear that the vehicle will, under all conditions of road or load, be driven at a speed which utilizes the motor power in a highly efficient manner.

If the operator pushes the pedal 22 downward until the shiftable gear 28A is in mesh with the reverse idler gear 28C then the mechanism is set to drive the car backward with variable speed ratios likewise as is effected in the forward drive.

When the operator wishes to stop the car his left foot releases the motor clutch in the ordinary manner with pressure on the pedal 72. The elongated hole in the outer extremity of the lever 17 permits certain forward movement of the connecting rod 18 until the motor clutch is released after which a further forward movement of the pedal 72 moves the cam-lever 17 clutching the band 15 to the drum 14 to lock the latter to the case 4. This conditions the device in ultimate low gear; by means of the operator's right foot in the ordinary manner brakes are engaged with the wheels of the vehicle bringing it to a complete stop.

If the vehicle must descend a steep grade the operator may lock the device into ultimate low gear by means of the hand lever 19 which tightens the band 15 onto the drum 14 independently of the lever 17, the rod 40 being slidable within the sleeve 41 so that the inner end of the latter is engaged by the headed extremity of the rod 40 to move the sleeve 41 which is free to slide within the cam-lever 17 in the direction to effect tightening of the band 15.

The operator may again employ the hand lever 19 and resort to the last explained adjustment when traction is very poor and he desires to drive the car in slowest gear. And it will be understood that the lever 19 may be of the best commercial design equipped with a ratchet mechanism for holding it locked in position, and where I have shown the two levers 44 and 46 connected by means of the spring 45 it will be understood that one may be employed fixed to the shaft 48.

To hold the vehicle parked on a steep grade the operator manipulates such another well designed hand lever 20 which is in operative connection with the band 8 and tightens the latter onto the peripheral surface of the gear 7 rendering the gear locked to the case 4.

If the car must be towed backwards the operator lifts the rod 73 with a suitable hand grip formed on its upper extremity and the lifted rod is latched in its desired position by means of any ordinary locking device such as is commonly employed for a similar purpose.

Although in Fig. 1 of the drawings I have illustrated some very elaborate and complicated mechanisms it will be understood that some of the combinations of elements may be simplified with substantially the same effect:—for example, I may simplify my centrifugal clutch so that the arrangement and formation of elements is similar to the construction illustrated in Fig. 7 of the drawings, wherein the roller 57 serves as a pivot for the weight 5, the latter being much heavier at its end 5H than at its end 5G so that under centrifugal pressure the roller 5D must always bear against the cam 34, and the roller 57 must always bear against the cam race of the cam 6, an elongated hole being provided adjacent the end 5G in the weight 5 for free movement upon the pin 30. A spring 29 may be provided hooked between each weight 5 and the driven shaft 2 in a manner to always hold the rollers 5D and 57 in proper relation to their respective cams.

Another equivalent form and arrangement of parts for my centrifugal clutch is illustrated in Fig. 8 of the drawings in which the cam race of the cam 6 is variably elliptical with a section through the line G—G an ellipse having its minor axis shortest relative to its major axis, and an infinite number of elliptical sections with minor axes becoming longer as the sections approach the line F—F where the cam is circular in cross section; hence, it will be obvious that the weights 5E revolved with the driving shaft will have greater impelling force on the cam 6 when the centrifugal pressure increases in the weights 5 and moves the longitudinally slidable carrier 66 farther forward on the shaft 1, operative connection being had through the connecting rods 64 joining the weights 5 to the collar 65, the latter being loosely mounted on the sleeve-like portion of the carrier 66 in a manner to move the latter longitudinally of the shaft 1. A spring 29A suitably hooked between the carrier 66 and each weight 5E always holds the latter in proper relation to the cam 6. The springs 67 draw the carrier 66 longitudinally backward when the speed of the shaft 2 is sufficiently decreased. The tension of the springs 67 may be adjusted in any ordinary manner.

Still another equivalent construction somewhat similar to that shown in Fig. 8 is illustrated in Fig. 11 wherein the weights 5E are pivoted on the pins 70 in the carrier 66, each weight disposed with practically one half of its mass in front of the pins 70 and one half in the rear of the pins, and each weight having an elongated hole 5F disposed to allow free longitudinal movement of the carrier 66 relative to the weights 5E so that certain centrifugal pressure in the weights 5 overcomes the tension in the springs 67A and moves the carrier 66 rearward shifting the mass of each weight 5E so that it is effectively greater in front of the pins 70, each spring 29A being tensioned to normally force the respective weight 5E forward into proper relation with the cam 6. The collar 65 is preferably made in halves which are clamped together by means of the bolts 68 in a relation to permit of free rotation of the carrier 66 relative to the collar.

Fig. 4 of the drawings shows a method of substituting one hand lever 49 employed in lieu of the two levers 19 and 20 for the purpose of manually operating the bands 8 and 15. By means of moving the sleeve 50 longitudinally on the upper extremity of the lever 49 the latter may be alternately connected with the bands 8 and 5 whereas the connecting rod 54 joins the sleeve 50 to a dual pawl 53 pivoted in the lever 49 in a manner to be engaged with the series of teeth 19A or 20A. The teeth 19A are suitably disposed fixed on the element 20 in positive connection with the band 8, and the teeth 20A similarly are fixed to the element 19 in positive connection with the band 15.

I may wish to employ any other suitable arrangement of planetary gearing such as is adaptable for use in my device of which some others are illustrated and described in my Letters Patent No. 1,678,595. Likewise a perusal of this last named patent which was granted on July 24, 1928, will make it obvious that I may greatly vary the detail and arrangement of parts as is clearly pointed out where I have shown and described similar and equivalent constructions. For example I may employ unbalanced planet-gears to assist in regulating the rotation and revolution of said gears; the planet-gear carrier may be loosely mounted upon either or both of the shafts 1 and 2; I may employ an automatically actuated pawl in lieu of the band 60; I may wish to use but one weight 5 as illustrated in Fig. 7, a pair of weights, or I may employ several pairs; and while it is preferable to have in the assembly two of the spiral planet-gears 13, for some requirements I may wish to employ but one of these planet-gears. To facilitate assembling, the internal spiral gear 7 may be made in halves and fixed together in any ordinary manner by means of cap screws, bolts or the like. The lugs which I have shown as integral projections from the ring 59 I may desire to have formed as fixed projections from the drum 14, and in lieu of the ring 59 and the springs 59A I may wish to construct the arm 16A as a resilient member. Where I have shown plain bearings in which shafts are journaled I may employ any of the ordinary antifriction bearings which are commonly used in similar constructions. I may provide also a plurality of the tapped holes 35A as is shown passing through the lateral sides of the weights 35 and 36, these tapped holes being provided for the purpose of adjusting each weight element 39 for suitable radial location relative to the axis of the shaft 1. As shown in Fig. 4 of the drawings when I employ one hand lever 49 in lieu of the two levers 19 and 20 an arm 52 may be fixed to the dual pawl 53 and suitably joined to the lever 49 by means of a spring 51, the latter being disposed in the ordinary manner to be swung past a pivot 55 for the purpose of holding the dual pawl in either of its engaged positions. In lieu of the foot pedals 21 and 22 I may connect the gear 28A in any ordinary manner with a hand lever, preferably located on the steering post for automobile installation. The cams 34 and 6 are preferably elliptical in cross section, however the cam races may be of any other suitable design, and in lieu of the eccentrics 1A and 1B integral with the shaft 1 I may employ an arrangement of gears such as is illustrated in Fig. 17 of my Letters Patent No. 1,678,595. Each spring 37A as shown in Fig. 3 of the drawings may be omitted from the construction and the fins 38A may be formed integral with each cap 38 and projectedly disposed to meet with a respective weight element 39 in a manner to hold the cap in desired position. When my three-way centrifugal clutch is formed and arranged as shown in Fig. 7 of the drawings I may make each weight 5 from two kinds of metal, one having a higher specific gravity than the other, the portion nearest the extremity 5H being made from the heavier metal. In most cases it is preferable to have the cam race of the cam 6 formed relative to the cam race of the cam 34 so that the clutching effect on the latter is greater than on the cam 6; however, this relation may be varied for special conditions.

While I have illustrated and described fair working examples of my improvements I do not wish to be understood as limiting myself to the specific details of construction and formation of elements shown, as under the spirit of my invention I believe that I am entitled to employ a wide variation of detail such as may fall within the scope of the appended claims, such departure from the specific statements of construction may include all obvious simplification where I have purposely elaborated redundantly; as for example, my three-way clutch which is shown connecting the driving shaft, the driven shaft and the planet-gear carrier may be simplified by making the clutch connection between two of the elements instead of the three providing a working device of minor limitations which may be warranted for special conditions.

Having thus described my invention, what I claim as new and desire to secure by Letters Patent, is:—

1. In a device of the class described, the combination of a driving shaft, a load-carrying driven shaft, a planetary differential gear-assembly positively connecting the driven shaft to the driving shaft, planet-gear revolution control means, clutch means operatively connecting the driven shaft to the ensemble including the driving shaft, the planet-gear carrier, and the gears connecting the driving shaft to said carrier, said clutch means possessing centrifugally operating weights free to be moved against centrifugal resistance, and means in connection with said ensemble to move said weights against centrifugal resistance whereby to vary gradually the ratio of speed transmission.

2. In a device of the class described, the combination of a driving shaft, a load-carrying driven shaft, a planetary differential gear-assembly positively connecting the driving and driven shafts, planet-gear revolution control means, centrifugally controlled clutch means operatively connecting the driven shaft to the ensemble including the driving shaft, the planet-gear carrier, and the gears connecting the driving shaft to said carrier, a second clutch means operatively connecting the driving shaft to the driven shaft whereby to vary gradually the ratio of speed transmission.

3. In a device of the class described, the combination of a driving shaft, a load-carrying driven shaft, a planetary gear-assembly in combination with an internal driven gear, said gear-assembly positively connecting the driving shaft to the driven shaft, a case, manually actuated frictional braking means fixed to the case and disposed for frictional relation with the peripheral surface of the internal gear, planet-gear revolution control means, and clutch means operatively connecting the driven shaft to the ensemble including the driving shaft, the planet-gear carrier, and the gears connecting the driving shaft to said carrier whereby to vary gradually the ratio of speed transmission.

4. In a device of the class described, the combination of a driving shaft, a load-carrying driven shaft, a planetary differential gear-assembly positively connecting the driving and driven shafts, planet-gear revolution control means, a drum in connection with the planet-gear carrier, a case, frictional braking means operatively connecting the case to the drum, means to connect a power control means to said braking means and with means to prevent the manipulation of the braking means when the power is effectively engaged to the driving shaft, and clutch means operatively connecting the driven shaft to the ensemble including the driving shaft, the planet-gear carrier, and the gears connecting the driving shaft to said carrier whereby to vary gradually the ratio of speed transmission.

5. In a device of the class described, the combination of a driving shaft, a load-carrying driven shaft, a planetary differential gear-assembly positively connecting the driving and driven shafts, planet-gear revolution control means, a drum in connection with the planet-gear carrier, a case, frictional braking means operatively connecting the case to the drum, means to connect a power control means to said braking means possessing means to prevent the manipulation of the braking means when the power is effectively engaged to the driving shaft, a second control means operatively connected to the braking means and acting independently of the first, and clutch means operatively connecting the driven shaft to the ensemble including the driving shaft, the planet-gear carrier, and the gears connecting the driving shaft to said carrier whereby to vary gradually the ratio of speed transmission.

6. In a device of the class described, the combination of a driving shaft, a load-carrying driven shaft, a planetary differential gear-assembly positively connecting the driving and driven shafts, planet-gear revolution control means, a case, braking means in connection with the case and the driven shaft, braking means in connection with the case and the planet-gear carrier, control means for manually operating the braking means, and clutch means operatively connecting the driven shaft to the ensemble including the driving shaft, the planet-gear carrier and the gears connecting the driving shaft to said carrier whereby to vary gradually the ratio of speed transmission.

7. In a device of the class described, the combination of a driving shaft, a load-carrying driven shaft, a planetary differential spiral-gear assembly positively connecting the driving and driven shafts, a case, a drum in connection with the planet-gear carrier, automatically actuating frictional braking means in connection with the case and the drum, and clutch means operatively connecting the driving and driven shafts whereby to vary gradually the ratio of speed transmission.

8. In a device of the class described, the combination of a driving shaft, a load-carrying driven shaft, a planetary differential gear-assembly positively connecting the driving and driven shafts, planet-gear revolution control means, centrifugally operating weights in positive connection with the driven shaft and free to be moved against centrifugal resistance, means in connection with the driving shaft to move said weights against centrifugal resistance, and means in connection with the planet-gear carrier to move said weights against centrifugal resistance whereby to vary gradually the ratio of speed transmission.

9. In a device of the class described, the combination of driving shaft, a load-carrying driven shaft, a planetary differential gear-assembly positively connecting the driving and driven shafts, unbalanced planet-gears, planet-gear revolution control means, clutch means operatively connecting the driving shaft, the driven shaft and the planet-gear carrier whereby to vary gradually the ratio of speed transmission.

10. In a device of the class described, the combination of a driving shaft, a load-carrying driven shaft, a planetary differential gear-assembly positively connecting the driving and driven shafts, planet-gear revolution control means, three-way centrifugal clutch means operatively connecting the driving shaft, the driven shaft and the planet-gear carrier, a second clutch means operatively connecting the driving shaft to the driven shaft whereby to vary gradually the ratio of speed transmission.

11. In a device of the class described, the combination of a driving shaft, a load-carrying driven shaft, a planetary differential gear-assembly positively connecting the driving and driven shafts, planet-gear revolution control means, clutch means operatively connecting the driven shaft to the planet-gear carrier, centrifugally controlled governor means in operative connection with the driven shaft and the clutch means, a second clutch means operatively connecting the driving shaft to the driven shaft whereby to vary gradually the ratio of speed transmission.

12. In a device of the class described, the combination of a driving shaft, a load-carrying driven shaft, a planetary differential gear-assembly in combination with an internal driven gear positively connecting the driving and driven shafts, clutch means operatively connecting the driven shaft to the ensemble including the driving shaft, the planet-gear carrier, and the gears connecting the driving shaft to said carrier, centrifugally controlled governor means in operative connection with the driven shaft and the clutch means, a drum in connection with the planet-gear carrier, a case, automatically actuated frictional braking means in connection with the drum and the case whereby to vary gradually the ratio of speed transmission.

13. In a device of the class described, the combination of a driving shaft, a load-carrying driven shaft, a planetary differential gear-assembly in combination with an internal driven gear positively connecting the driving and driven shafts, clutch means operatively connecting the driving shaft, the driven shaft and the planet-gear carrier, a case, a drum in connection with the planet-gear carrier, a brake band disposed in clutching relation with the drum and having positive connection with the case, and automatically actuating control means to clutch and unclutch the brake band relative to the drum whereby to vary automatically the ratio of speed transmission.

14. In a device of the class described, the combination of a driving shaft, a load-carrying driven shaft, a planetary differential gear-assembly in combination with an internal driven gear positively connecting the driving and driven shafts, clutch means operatively connecting the driving shaft, the driven shaft and the planet-gear carrier, a case, a drum in connection with the planet-gear carrier, manually actuated frictional braking means in connecton with the case and the drum, automatically actuating frictional braking means in connection with the case and the drum whereby to vary automatically the ratio of speed transmission.

15. In a device of the class described, the combination of a driving shaft, a load-carrying driven shaft, a planetary differential gear-assembly positively connecting the driving and driven shafts, clutch means operatively connecting the driving shaft, the driven shaft and the planet-gear carrier, a case, a drum in connection with the planet-gear carrier, frictional braking means in connection with the case and the drum, foot-control means in operative connection with the braking means, hand-control means in operative connection with the braking means and acting independently of the foot-control means, automatically actuating planet-gear revolution control means whereby to vary automatically the ratio of speed transmission.

16. In a device of the class described, the combination of a driving shaft, a load-carrying driven shaft, a planetary differential gear-assembly positively connecting the driving and driven shafts, said gear-assembly including a gear-carrying element mounted on one of the shafts for relative rotation to said shafts, a spiral gear connected to the driving shaft, an internal spiral gear connected to the driven shaft, a spiral planet-gear journaled for rotation in the gear-carrying element and in mesh with the aforesaid gears, means to control the revolution of the planet-gear, automatically actuating clutch means clutchingly connecting the driving shaft to the driven shaft and the driven shaft to the planet-gear carrier whereby to vary gradually the ratio of speed transmission.

Signed at Lansing, in the county of Ingham and State of Michigan, this 3rd day of December, 1928.

GAIL H. HINES.